June 24, 1930.  F. C. BITZENBURGER  1,767,042
YIELDABLE BACK SUPPORT FOR SEATS
Filed April 8, 1925
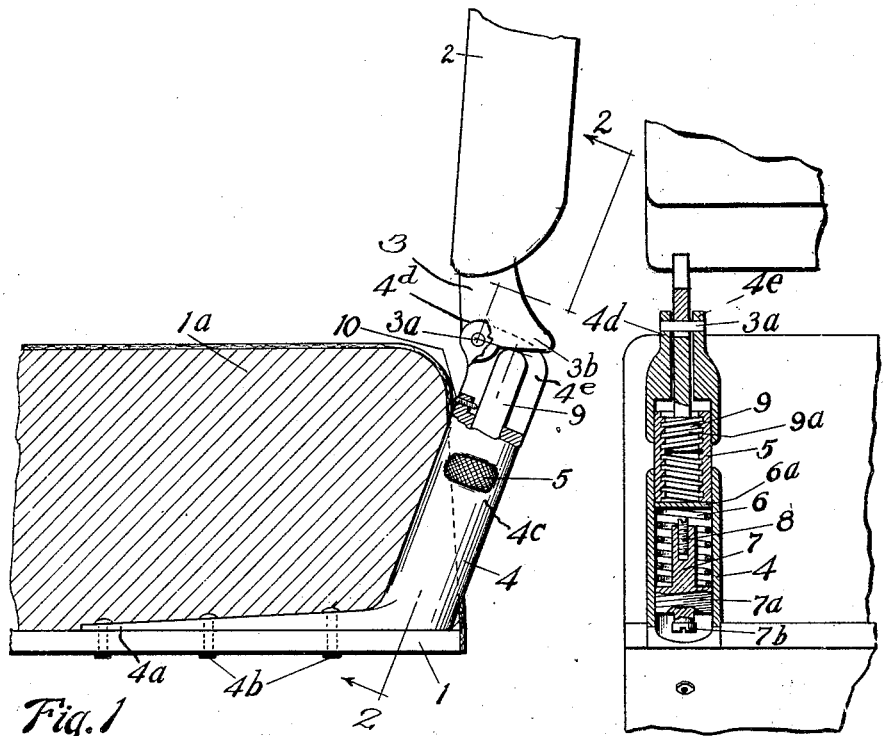
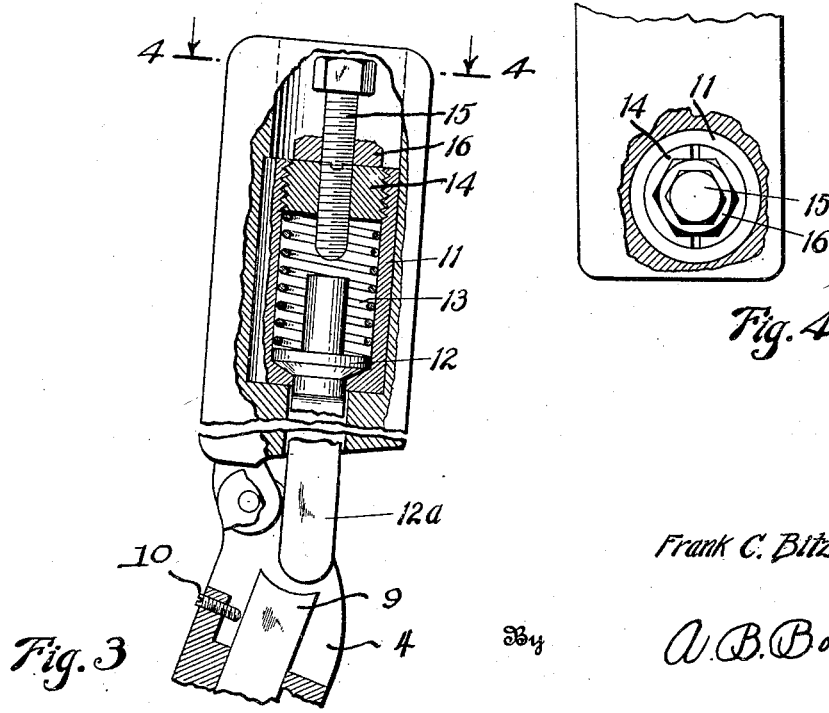
Inventor
Frank C. Bitzenburger
By A. B. Bowman
Attorney Patented June 24, 1930

1,767,042

UNITED STATES PATENT OFFICE

FRANK C. BITZENBURGER, OF LOS ANGELES, CALIFORNIA

YIELDABLE BACK SUPPORT FOR SEATS

Application filed April 8, 1925. Serial No. 21,715.

My invention relates to yieldable back supports for seats, more particularly to that class in which the back is movable relatively to the seat and resiliently supported, and the objects of my invention are:

First, to provide a resilient back supporting means for seats which is adjustable and provided with a stop means which is also adjustable, thus providing a seat back which may be reclined to various adjusted positions and provided with a stop which may be variously adjusted. Second, to provide a structure of this class which is very simple to manufacture and easy to adjust. Third, to provide a seat back of this class which may be folded forwardly to a position approximately parallel with the seat or backwardly to a position approximately parallel with the seat or may be reclined and stopped at any intermediate positions between the horizontal and vertical in its backward movement. Fourth, to provide a means for adjusting the tension of the resilient means as well as the position of the stop for the reclining position. Fifth, to provide a novelly constructed yieldable seat back and sixth, to provide a seat back means of this class which is very simple and economical of construction, durable, adjustable throughout, provided with adjustable positive stops, flexible in its action, foldable forwardly and backwardly to a horizontal position and which will not readily deteriorate or get out of order.

With these and other objects in view as will appear hereinafter, my invention consists of certain novel features of construction, combination and arrangement of parts and portions as will be hereinafter described in detail and particularly set forth in the appended claims reference being had to the accompanying drawings and to the characters of reference thereon which form a part of this application, in which:

Figure 1 is a side elevational view of my resilient seat back supporting means shown in connection with the seat shown in section and showing a portion of the means broken away and in section to facilitate the illustration. Fig. 2 is a sectional view through 2—2 of Fig. 1. Fig. 3 is a sectional view of a modified form showing an adjustable resilient means in connection therewith, adding adjustibility and resiliency and Fig. 4 is a view from the line 4—4 of Fig. 3.

Similar characters of reference refer to similar parts and portions throughout the several views of the drawings.

The seat member 1, seat back 2, seat back supporting bracket 3, main supporting bracket 4, sleeve member 5, spring 6, adjusting plug 7, stop adjusting screw 8 and back positioning member 9 constitute the principal parts and portions of my means in its preferred form.

The seat 1 and back 2 may be of the conventional type, upholstered if desired. Secured on the seat 1 and interposed between the support 1 and the upholstering $1^a$ is the portion $4^a$ of the bracket 4 and supported by means of bolts $4^b$. This bracket is provided with a hollow upwardly extending portion $4^c$ and with furcated portions $4^d$ and $4^e$ at its upper end. Pivotally mounted in the furcated portions $4^d$ and $4^e$ near one side thereof, is the back support 3, by means of a pin $3^a$. This back support 3 extends upwardly and is adapted to support the seat back 2, which may be secured to it in any manner desired. This seat back bracket 3 is provided with an extended lug $3^b$ which is adapted to fit into the space between the furcated portions $4^d$ and $4^e$ and rest against the upper end of the back positioning member 9. The lower end of the portion $4^c$ is threaded internally adapted for the screw threads $7^a$ of the plug 7, said plug member is provided with an extended portion $7^b$ provided with a slot for a screw driver, to facilitate the turning of the plug 7. The reduced upwardly extending portion of this plug 7 is provided with a threaded screw 8 which forms a stop for the disc $6^a$ resting on the upper end of the spring 6 and supporting the plunger or sleeve 5, thus providing a positive stop for the backward movement of the seat back. The plug 7 supports the spring 6 and provides an adjustment therefor by raising and lowering the same relative to the back of the seat. The sleeve 5 is shiftably mounted in the hollow portion of the portion 4ᶜ and is internally threaded adapted for the threads 9ᵃ on the back positioning member 9. Thus, by shifting the sleeve 5, another adjustment is provided for the seat back. It will be noted that the seat back comes to a positive stop when the members 5, 9 and 6ᵃ are shifted downwardly by the pressure on the seat back until the plate 6ᵃ rests against the screw 8, thus providing three adjustments, the sleeve 5, the screw 8 and the plug 7. There is also provided in the portion 4ᶜ a set screw 10 which serves as a stop for the lug 3ᵇ when the seat is extended backwardly to a position approximately horizontal and this set screw is adjustable for adjusting the position of the positive stop of the seat back in its approximately horizontal position.

In the modified form shown in Figs. 3 and 4 the rest of the seat structure is the same as hereinbefore described but there is added to the seat back 2 a cylindrical member 11 in the one end of which is reciprocally mounted a plunger member 12 which is provided with a flat portion 12ᵃ which is adapted to extend downwardly between the furcated portions 4ᵈ and 4ᵉ and rests on the member 9 and taking the place of the lug 3ᵇ on the member 3. Mounted against this plunger 12 at its upper side is a spring 13, the tension of which is adjusted by means of a plug 14 in the normally upper end of the cylindrical member 11, and mounted centrally in the plug 14 is an adjusting bolt 15 which is provided with a lock nut 16 for securing it in position, thus providing means for adjusting the plunger member 12 and providing a positive stop for its movement with the compression of the spring 13. It will be noted that this additional spring 13 and its adjusting means provides more flexibility and greater adjustment of the seat back relatively to the seat than in the preferred construction but adds slightly to the expense of manufacture.

Though I have shown and described a particular construction, combination, and a certain modification, I do not wish to be limited to this particular construction, combination, and arrangement nor to the modification but desire to include in the scope of my invention the construction, combination, and arrangement substantially as set forth in the appended claims.

Having thus described my invention, what I claim as new and desire to secure by Letters Patent, is:

1. In a seat back supporting means, a hollow cylindrical bracket secured to the seat, a seat back positioning member reciprocal longitudinally therein, resilient means for supporting said seat back positioning member therein, and a seat back supporting bracket pivotally mounted on said cylindrical bracket provided with an extending lug adapted to engage said seat back positioning member.

2. In a seat back supporting means, a hollow cylindrical bracket secured to the seat, a seat back positioning member reciprocal longitudinally therein, resilient means for supporting said seat back positioning member therein, a seat back supporting bracket pivotally mounted on said cylindrical bracket provided with an extending lug adapted to engage said seat back positioning member and adjustable stop means for regulating the movement of said seat back positioning means therein.

3. In a seat back supporting means, a hollow cylindrical bracket secured to the seat, a seat back positioning member reciprocal longitudinally therein, resilient means for supporting said seat back positioning member therein, a seat back supporting bracket pivotally mounted on said cylindrical bracket provided with an extending lug adapted to engage said seat back positioning member, adjustable stop means for regulating the movement of said seat back positioning means therein and means for adjusting the position of said resilient means.

4. In a back supporting means, a supporting bracket, a back member securing bracket pivotally mounted at the upper end of said supporting bracket and provided with an extending lug, a back member secured to said back member securing bracket, a threaded adjusting sleeve revolubly mounted within said supporting bracket, and a back positioning member provided with a threaded portion at its normally lower end engaging the threaded portion of said threaded sleeve and adapted to engage at its upper end the lug of said back member securing bracket.

5. In a back supporting means, a supporting bracket, a back member securing bracket pivotally mounted at the upper end of said supporting bracket and provided with an extending lug, a back member secured to said back member securing bracket, an internally threaded adjusting sleeve revolubly mounted within said supporting bracket and a back positioning member provided with a threaded portion at its normally lower end extending into and engaging the threads of said internally threaded sleeve adapted to engage at its upper end the lug of said back member securing brackets.

6. In a back supporting means, a supporting bracket, a back member securing bracket pivotally mounted at the upper end of said supporting bracket and provided with an extending lug, a back member secured to said back member securing bracket, a threaded adjusting sleeve revolubly mounted within said supporting bracket and a back positioning member provided with a threaded portion at its normally lower end engaging the threaded portion of said threaded sleeve adapted to engage at its upper end the lug of said back member securing brackets.

7. In a back supporting means, a supporting bracket, a back member securing bracket pivotally mounted in said supporting bracket and provided with an extending lug, a back member secured to said back member securing bracket, a threaded adjusting sleeve revolubly mounted within said supporting bracket and a back positioning member provided with a threaded portion at its normally lower end engaging the threaded portion of said threaded sleeve and adapted to engage at its upper end the lug of said back member securing bracket.

8. In a back supporting means, a supporting bracket, a back member securing bracket pivotally mounted on said supporting bracket, one of said brackets being provided with an extended lug, a threaded adjusting sleeve revolubly mounted on the other of said brackets, and a back positioning member provided with a threaded portion at one end engaging the threaded portion of said threaded sleeve and adapted to engage at its opposite end said lug.

9. In a back supporting means, a supporting bracket, a back member securing bracket pivotally mounted on said supporting bracket, one of said brackets being provided with an extended lug, a threaded adjusting sleeve revolubly mounted on the other of said brackets, a back positioning member provided with a threaded portion at one end engaging the threaded portion of said threaded sleeve and adapted to engage at its opposite end said lug, a spring in the latter bracket in connection with said sleeve, and adjusting and stop means adapted simultaneously and independently to vary the force of said spring and to be shifted to various stop positions for said back supporting bracket.

10. In a back supporting means, a supporting bracket, a back member securing bracket pivotally mounted on said supporting bracket, one of said brackets being provided with an extended lug, a threaded adjusting sleeve revolubly mounted on the other of said brackets, a back positioning member provided with a threaded portion at one end engaging the threaded portion of said threaded sleeve and adapted to engage at its opposite end said lug, and adjustable stop means on the latter bracket for regulating the movement of said seat back positioning member therein.

11. In a back supporting means, a supporting bracket, a back member securing bracket pivotally mounted on said supporting bracket, a plunger reciprocally mounted in one of said brackets, a spring positioned in the latter bracket for forcing said plunger outwardly resiliently toward the latter bracket, and an adjustable stop means at the inner end of said plunger for limiting the inward shifting of the plunger and the backward position of the back supporting bracket relative to the first bracket.

12. In a back supporting means, a supporting bracket, a back member securing bracket pivotally mounted on said supporting bracket, a plunger reciprocally mounted in one of said brackets, a spring positioned in the latter bracket for forcing said plunger outwardly resiliently toward the latter bracket, and an adjustable stop means in connection with one of said brackets for limiting the backward position of the back supporting bracket relative to the first bracket.

13. In a convertible seat, a seat, a supporting bracket in connection therewith, a back member securing bracket pivotally mounted on said supporting bracket, a back member secured to said latter bracket, a plunger reciprocally mounted in one of said brackets, and a spring positioned in the latter bracket for forcing said plunger outwardly resiliently toward the other bracket, said plunger being adapted to be drawn inwardly for permitting the back supporting bracket to be folded backwardly with the back member to substantially the same horizontal level with said seat.

14. In a convertible seat, a seat, a supporting bracket in connection therewith, a back member securing bracket pivotally mounted on said supporting bracket, a back member secured to said latter bracket, one of said brackets being provided with an extended lug, a threaded adjusting sleeve revolubly mounted on the other of said brackets, a back positioning member provided with a threaded portion at one end engaging the threaded portion of the sleeve and adapted to engage at its opposite end said lug, said positioning member being adapted to be screwed inwardly by said sleeve for permitting the same to clear said lug and for permitting the back supporting bracket to be folded backwardly with the back member to substantially the same horizontal level with said seat.

15. In a seat back supporting means, a supporting bracket, a back supporting bracket pivotally mounted thereon, one of said brackets having a cylindrical portion, a seat back positioning member reciprocal longitudinally in said cylindrical portion, and a resilient means for resiliently supporting said seat back positioning member in said cylindrical portion, said other bracket being provided with an extended lug adapted to engage said seat back positioning member.

16. In a seat back supporting means, a supporting bracket, a back supporting bracket pivotally mounted thereon, one of said brackets having a cylindrical portion, a seat back positioning member reciprocal longitudinally in said cylindrical portion, a resilient means for resiliently supporting said seat back positioning member in said cylindrical portion, said other bracket being provided with an extended lug adapted to engage said seat back positioning member, and adjustable stop means for regulating the movement of said seat back positioning member.

In testimony whereof, I have hereunto set my hand at Los Angeles, California, this 2nd day of April, 1925.

FRANK C. BITZENBURGER.